US005698657A

United States Patent [19]

Conner et al.

[11] Patent Number: 5,698,657

[45] Date of Patent: Dec. 16, 1997

[54] FLEXIBILIZING EPOXY RESINS WITH LOW MOLECULAR WEIGHT ACRYLATE COPOLYMERS

[75] Inventors: Mark David Conner, New Tripoli; Richard Henry Bott, Macungie; William Edward Starner, Nesquehoning; Lloyd Mahlon Robeson, Macungie, all of Pa.

[73] Assignee: Air Products and Chemicals, Inc., Allentown, Pa.

[21] Appl. No.: 510,728

[22] Filed: Aug. 3, 1995

Related U.S. Application Data

[63] Continuation-in-part of Ser. No. 437,476, May 9, 1995, abandoned.

[51] Int. Cl.$^{6}$ .......................... C08G 59/68; C08G 65/10

[52] U.S. Cl. .......................... 528/93; 528/156; 528/113; 525/165; 525/178; 525/187; 525/191

[58] Field of Search .......................... 528/93, 106, 113; 525/165, 178, 187, 191

[56] References Cited

U.S. PATENT DOCUMENTS

| | | | |
|---|---|---|---|
| 3,567,677 | 3/1971 | Donaetz et al. | 260/37 |
| 4,521,490 | 6/1985 | Pocius et al. | 428/416 |
| 4,524,181 | 6/1985 | Adam et al. | 525/107 |
| 4,565,853 | 1/1986 | Herscovici et al. | 525/530 |
| 5,098,780 | 3/1992 | Nemunaities et al. | 428/312.4 |
| 5,334,654 | 8/1994 | Starner et al. | 524/849 |

FOREIGN PATENT DOCUMENTS

| | | | |
|---|---|---|---|
| 1216385 | 1/1987 | Canada | 400/200 |

OTHER PUBLICATIONS

Ochi, M. et al. "Rubber–Modified Epoxy Resins Containing High Functionality Acrylic Elastomers." *Journal of Applied Polymer Science*, 29, 1984: 1381–1391.

*Primary Examiner*—Samuel A. Acquah
*Assistant Examiner*—Duc Truong
*Attorney, Agent, or Firm*—Mark L. Rodgers

[57] ABSTRACT

Flexible epoxy resins are made by curing the epoxy with an amine curing agent in the presence of a low molecular weight acrylate copolymer made from a major amount of a lower aliphatic ester or amide of acrylic or methacrylic acid and a minor amount of an ethylenically unsaturated monomer having functionality reactive with functional groups present in the epoxy resin or its curing agent. The acrylate copolymer has a number average molecular weight in the range of 1000 to 6000, preferably 2000 to 3000, and a ratio of weight average to number average molecular weight in the range of 1 to 3.5. Copolymers of butylacrylate and acrylic acid or maleic anhydride are favored. Further advantages are realized by including in the cure formulation a monofunctional diluent reactive with the curative.

17 Claims, No Drawings

FLEXIBILIZING EPOXY RESINS WITH LOW MOLECULAR WEIGHT ACRYLATE COPOLYMERS

CROSS REFERENCE TO RELATED APPLICATIONS

This application is a continuation-in-part of U.S.patent application Ser. No. 08/437,476, filed May 9, 1995, now abandoned.

FIELD OF THE INVENTION

This invention relates to a method of making flexible epoxy resins using low molecular weight acrylate copolymers. In another aspect it relates to a cured epoxy resin which has been formulated with a low molecular weight acrylate copolymer as a flexibilizer.

BACKGROUND OF THE INVENTION

Polymeric epoxy resins have been widely used as coatings in both industrial and civil engineering applications because they can be made to adhere well to a substrate and provide good protection from moisture and chemicals. For some uses, however, such as in coatings for concrete structures, it has been difficult to develop resins having sufficient flexibility and elongation to withstand impact and cover shrinkage-induced cracks. Additives to the resin formulations or structural modifications of the polymer to improve elongation properties frequently result in loss of moisture and chemical resistance or compatibility problems which adversely affect strength and appearance.

One of the earliest methods of improving flexibility in epoxy resins was the addition of coal tar or similar material to the formulation. More, recently the use of long chain modifiers or flexibilizers in the form of resins, curatives or reactive materials has been favored, partially because of concerns about the carcinogenicity of coal tar materials. Changes in epoxy resin properties have been effected by increasing the aliphatic character of the resin, lowering its crosslink density through election of curative or modifier, and by adding flexibilizers.

U.S. Pat. No. 3,567,677, Donaetz et al. (1971) discusses the need to improve the flexibility of epoxy potting compounds and addresses the problem by formulating diglycidyl ether of bisphenol A with diepoxide of polyglycol using a curative such as N-aminoethylpiperazine or its adduct with allylglycidyl ether.

U.S. Pat. No. 5,098,780, Nemunaitis et al. (1992) discusses the need for crack-bridging properties in concrete coatings and sets forth a solution by formulating an epoxy base coat having 50 to 400 percent elongation using a flexibilizing agent, e.g. a phenol blocked isocyanate. The curatives are modified cycloaliphatic amines and aliphatic polyamines.

U.S. Pat. No. 4,521,490, Pocius et al. (1985) and U.S. Pat. No. 4,524,181, Adam et al. (1985) describe reducing brittleness in epoxy resins by incorporating colloidally dispersed elastomeric particles, such as polymers of hexyl acrylate, formed by in-situ polymerization. The '181 patent describes adding a stabilizer which is partially soluble in the epoxy resin and partially soluble in the elastomeric particles.

Canadian Patent No. 1,216,385, Kim (1987) discloses epoxy adhesive modified by in-situ polymerization with the epoxy resin of an alkyl acrylate, such as butyl acrylate, and a grafting agent such as an ethylenically unsaturated carboxylic acid, for example, acrylic acid. U.S. Pat. No. 4,565,853, Herscovici et al. (1986) improves on this approach by adding a chain transfer agent, such as bromotrichloromethane, to allow for higher amounts of rubber to be present with less chance of gelation. Both of these approaches, however, suffer from the necessity of workers handling volatile and toxic acrylate monomers during the preparation of the cured epoxy. In addition, the in-situ polymerization method suffers from a lack of control of the polymer Mw when compared to polymer prepared in a plant prior to incorporation into the cured epoxy.

Ochi and Bell, J. Applied Polymer Science, 29, pp 1381–1391 (1984) report a study of the effect of functionality of a n-butylacrylate/acrylic acid copolymer when reacted with an epoxy resin before curing on the impact strength of the epoxy product. The copolymers studied were of moderate molecular weight ($M_n$ of 6070 to 7570; $M_w$ of 31,700 to 40,600 by GPC) and served to increase the toughness of the epoxy resin with an optimum functionality. The copolymer prepared by bulk polymerization was first reacted with the epoxy resin in the presence of a catalyst for the epoxy-carboxyl reaction, proceeding until practically no carboxyl groups remained, and then the modified epoxy resin was cured with an amine curing agent, methylenedianiline.

U.S. Pat. No. 5,334,654, Starher et al. (1994) discloses increasing elasticity of epoxy resins with an acrylate terminated urethane prepolymer and a monofunctional aliphatic ether or ester amine-reactive component, such as an aliphatic glycidyl ether or ester or a $C_1$ to C18 alkyl ester of acrylic or methacrylic acid.

SUMMARY OF THE INVENTION

It has been found that low molecular weight acrylate copolymers having functionality reactive with functional groups present in the epoxy resin or its curative can be added to the curing formulation of the epoxy resin to provide a flexible resin. In this way epoxy resins exhibiting elongation values on the order of 20 to 200 percent can be obtained. The acrylate copolymers are formed by copolymerizing a major amount of a lower aliphatic ester or amide of acrylic or methacrylic acid with a minor amount of an ethylenically unsaturated monomer containing the functional groups required in the copolymer. This copolymerization is carried out in such a way that the copolymer has a number average molecular weight ($M_n$) of 1000 to 6000 daltons, preferably in the range of 2000 to 3000, and typically a ratio of weight average to number average molecular weight ($M_w/M_n$) in the range of 1 to 3.5. Curing the uncured epoxy resin with an amine curing agent in carried out in the presence of a flexibilizing amount of the functional acrylate copolymer.

It is further advantageous to carry out the curing step in the presence of an amine-reactive monofunctional diluent in an amount sufficient to reduce the crosslink density in the cured epoxy resin. This is the monofunctional diluent disclosed by Starher et al. in the '654 patent cited above.

DETAILED DESCRIPTION OF THE INVENTION

The epoxy resins which are formulated and cured according to the invention are polyepoxides having a 1,2-epoxy equivalence greater than one. A number of examples of suitable epoxy resins are given by Lee and Neville, *Handbook of Epoxy Resins,* McGraw-Hill, New York, 1967. The preferred polyepoxides are polyglycidylethers, particularly polyglycidylethers of bisphenol A. Other useful epoxy resins include 1,4-butanediol diepoxide as well as cycloaliphatic polyepoxides which are prepared by epoxidation of cyclic olefins. The preferred epoxy resin or resin mixture has an epoxide equivalent weight (EEW) in the range of 150 to 2500, and in the case of hisphenol A resins, it is particularly convenient to use a resin having an EEW of 150 to 250, and preferably 190, which allows the resin to be in the liquid form. Liquid resins are preferred for formulation according to the invention since curing can occur without formation of volatile organic compounds which raise environmental and safety concerns.

The epoxy resin is generally present in the curable formulation in from 20 to 80 percent, preferably 25 to 75 percent based on the total weight of the cured product, depending upon the specific use intended. The specific amine compound selected as the curative depends upon the desired flexibility of the cured product and the nature of other additives in the composition, such as added flexibilizers or reactive diluents. The functionality of the amine curing agent is determined by the number of active hydrogen atoms present in the curative, and the specific curative chosen will determine the level of flexibilizer and monofunctional diluent needed to obtain a given elongation in the cured epoxy resin. Generally, as the functionality of the curative is lowered, the amount of added flexibilizer or reactive diluent can also be lowered to maintain a desired percent elongation. In this way one can obtain better control of the epoxy resin properties. To obtain higher elongations, one can decrease the curative functionality and increase the level of added flexibilizer and/or reactive diluent.

Any aliphatic or cycloaliphatic amine compound known to be an epoxy curative can be used in practicing this invention, but preferred curatives include 1-(2-aminoethyl) piperazine (AEP) and bis(p-aminocyclohexyl)methane (PACM). Especially preferred are the alkylated diamines made by reductive alkylation of alkylene diamines with aldehydes or ketones of moderate chain length, as disclosed in the copending patent application cross referenced above. Favored among such curing agents are the monoalkylated adducts of 2-methyl-1,5-pentanediamine and methyl isobutyl ketone, acetophenone, benzaldehyde, 2-ethylhexanal, or 2-tridecanone. These adducts can be prepared by reductive alkylation in the liquid phase under hydrogen pressure and at elevated temperature using conventional hydrogenation catalysts, such as palladium or rhodium on carbon. The catalyst is filtered out and the adducts recovered by fractional distillation.

The acrylate copolymers used as epoxy resin flexibilizers according to our invention are low molecular weight poly (acrylate) compositions in which esters or amides of acrylic or methacrylic acid make up the major component with the minor component being epoxy, amine or alcohol reactive, ethylenically unsaturated comohomers. By "low molecular weight" is meant having a number average molecular weight ($M_n$) in the range of 1000 to 6000 daltons, preferably 2000 to 3000 daltons, and a weight average to number average ratio of molecular weights ($M_w/M_n$) in the range of 1 to 3.5. Acrylate modifiers which are higher or lower in molecular weight than indicated result in decreased performance and compatibility. Also, acrylate flexibilizers which are higher in molecular weight than indicated will increase formulation viscosity making mixing more difficult and may result in phase separation prior to epoxy curing which is not desired.

The term "acrylate copolymer" as used herein is meant to include both esters and amides of acrylic or methacrylic acid. Examples of acrylic acid esters and amides which can be used to make the acrylate copolymer include lower aliphatic esters and amides, preferably $C_1$ to $C_7$ alkyl acrylates and methacrylates, such as ethylacrylate, n-butylacrylate, n-hexylacrylate, 2-methyl-n-hexylacrylate, and the like, acrylamide and methacrylamide, $C_1$ to $C_7$ alkyl acrylamides and methacrylamides, N-vinylformamide, polyether esters of acrylic acid and methacrylic acid, hydroxyl and tertiary amine functional esters of acrylic acid and methacrylic acid such as 2-(N,N-diethylamino) ethyl (meth)acrylate, triethylene glycolmono(meth)acrylate monomethyl ether, diethylene glycolmono(meth)acrylate monomethyl ether, hydroxypropyl(meth) acrylate, and the like. Mixtures of monomers can also be used to form the base monomer package. In such mixtures, any desirable termonomer, such as styrene, alpha-methyl styrene, vinyl esters, dialkyl maleates, and the like, can be included in minor amounts. The most preferred monomers are the lower alkyl acrylates and more specifically, the $C_2$ to $C_6$ alkyl acrylates. By this it is meant alkyl esters or amides in which the alkyl group has 2 to 6 carbons. In general, however, any combination of such monomers which produces a copolymer with a $T_g$ less than about 25° C. can be used.

The comonomer used in forming the acrylate flexibilizer is an ethylenically unsaturated monomer which has epoxy or amine or alcohol reactive functional groups. Examples of such functional groups include carboxylic acid groups, carboxylic anhydride, isocyanato, hydroxyl, epoxy, siloxyl, halogen, and the like. Examples of hydroxyl group containing monomers include hydroxyethyl acrylate and methacrylate and hydroxybutylacrylate. Examples of acid containing functional monomers include acrylic and methacrylic acid, maleic acid, crotonic acid, itaconic acid, and the like. Examples of anhydride group containing monomers include maleic anhydride and analogous compounds. Examples of other possible comonomers include trimethoxysilylpropylmethacrylate, chloroethylacrylate, glycidyl acrylate and methacrylate, isocyanatoethylmethacrylate, chloromethylstyrene, and the like. The preferred functional comohomers are acrylic acid and maleic anhydride. The preferred amount of functional comohomer in the flexibilizer is from 1 to 15 percent, most preferably 3 to 12 percent by weight of the acrylate copolymer. It is also preferred that the alkyl acrylate make up the balance of the copolymer. Polymerization methods for such copolymers are well known in the art.

In addition to the flexibilizing copolymer, a reactive diluent can be included in the epoxy cure formulation. These diluents can be monofunctional epoxy or acrylate compounds as described in U.S. Pat. No. 5,334,654 of Starner et al., cited above. Broadly, the reactive diluent can be any compatible amine-reactive monofunctional material since its function in the curing step is to react with the curative and, being monofunctional, reduce crosslink density. Generally this compound is aliphatic in character, having a substituent which is reactive with amine hydrogen. Preferably such a diluent is a monofunctional epoxide, such as a $C_{12}$ to $C_{14}$ alkyl glycidyl ether, or a monofunctional acrylate, such as 2-ethylhexylacrylate. Other monofunctional glycidyl ethers or acrylates or methacrylates, such as those disclosed by Starner et al., can also be used to dilute the crosslinking potential of the epoxy resin.

The relative amounts of polyepoxy compound, monofunctional diluent and flexibilizer can vary broadly, depending upon the specific compounds selected, and Generally follow recipes well known in the art, for example as set forth in the Starher et al. patent. As a Guide, one can expect to use about 50 to 100 parts by weight of polyepoxy compound, 0 to 50 parts of reactive diluent, and 40 to 400 parts of flexibilizer per 100 parts of the epoxy resin/diluent components. The amount of curative is generally the stoichiometric quantity, more or less, required to react with the amine hydrogen reactive functions present in the formulation. This is in accordance with standard epoxy resin recipes. Also, the curing procedure can follow any of a number of methods known in the art for epoxies involving mixing and curing at ambient or elevated temperatures.

The combination of the curative with the flexibilizing acrylate copolymer and a reactive monofunctional diluent in epoxy resin formulations provides a very potent tool for tailoring epoxy resin properties to suit a given use. The flexibilizing agent supplies a resin segment which assists in developing the desired elongation property, while the amine curative and reactive diluent combine to control crosslink density in the cured epoxy resin.

In order to illustrate further the invention and its advantages, the following Examples are Given, the specific nature of which should not be construed to limit the invention unduly.

EXAMPLES 1–7

These Examples illustrate the preparation of the acrylate copolymer. Diluent, either 800 g of isopropanol (IP) or 400 g of tetrahydrofuran (THF) were charged to a 2000 mL three-neck round bottomed flask equipped with a mechanical stirrer, condenser, nitrogen line and thermometer. After purging for 10 to 15 minutes, butylacrylate (BA) and either acrylic acid (AA), acrolein (An) or maleic anhydride (MA) in the weight ratios Given in Table 1 were added followed by azobisisobutyronitrile (AIBN) initiator and dodecyl mercaptan (DDM) at the levels indicated in Table 1. Table 1 also shows the solids level for each run based on the monomers used. The reaction mixture was then heated to reflux with mechanical stirring using an oil bath. As the mixture approached reflux temperature, heating was discontinued until the initial exotherm dissipated, then heating was resumed such that reflux was continued for seven hours.

After cooling, the reaction mixture was evaporated in vacuo and dried for 16 hours at 74° C. to leave a clear, colorless or slightly yellow viscous liquid in about 95 percent yield. The number and weight average molecular weights were determined by GPC for each copolymer and are reported in Table 1.

TABLE 1

| Example | Monomer | Wt. Ratio | Diluent | % Solids | Wt. % AIBN | mL DDM | $M_n$ | $M_w$ |
|---|---|---|---|---|---|---|---|---|
| 1 | BA/AA | 90/10 | IP | 29 | 4% | 4.3 | 2493 | 5457 |
| 2 | BA/AA | 90/10 | IP | 29 | 1% | none | 5006 | 15702 |
| 3 | BA/AA | 90/10 | IP | 44 | 4% | 4.3 | >3300 | >7000 |
| 4 | BA/AA | 90/10 | IP | 10 | 4% | 4.3 | 1500 | 2770 |
| 5 | BA/An | 90/10 | IP | 29 | 4% | 4.3 | 2340 | 5280 |
| 6 | BA/MA | 90/10 | THF | 33 | 4% | 5.0 | 2186 | 6219 |
| 7 | BA/MA | 95/5 | THF | 32 | 4% | 5.0 | 2560 | 5756 |

In Example 2 higher molecular weight polymer was obtained by reducing the initiator level and eliminating the chain transfer agent (DDM). In Example 3 the molecular weight of the polymer was increased by increasing the solids level. The molecular weight was lowered by reducing the solids level in Example 4. Although the polymers from all seven runs are within the scope of the invention, the polymers of Examples 1 and 5–7 represent preferred embodiments of the flexibilizing additive.

EXAMPLES 8–25

These Examples present evaluation of specimens of epoxy resins cured in the presence of acrylate copolymer in accordance with the invention. The specimens were prepared by thoroughly mixing the uncured epoxy resin with the acrylate copolymer from one of the seven Examples given above, and, when used, with a monofunctional epoxide diluent. Addition of the amine curative was followed by additional thorough mixing and degassing at 10 mm Hg. The mixtures were then cured at either 70° C. for 16 hours or, in the case of Examples 23–25, for 14 days at room temperature, while molded in the desired shape of test plaques. Specimens were die cut from the plaques and tensile properties were measured according to ASTM D-638 protocol.

The epoxy resin used in each case was a diglycidyl ether of bisphenol A having an epoxy equivalent weight of 190. The monofunctional diluent which was used in every Example except Example 9 was a $C_{12}$ to $C_{14}$ monoglycidyl ether, and the acrylate copolymer and curative used for each Example were as given in Table 2. In Table 2 all parts given are parts by weight. The curatives used were either 4,4'-diaminodicyclohexylmethane (PACM 20) which is tetrafunctional, 1-(2-aminoethyl)piperazine (AEP) which is trifunctional, diethylenetriamine (DETA) which is pentafunctional, dimethylethylenediamine (DMEDA) which is bifunctional, or Ancamine® epoxy curative which is an aliphatic amine-based mixture. The appearance of the plaques are given in Table 2 as either clear and colorless, opaque, yellow or light brown. Tensile values at yield and at break were essentially identical for all specimens. This value and percent elongation for each specimen are given in Table 2.

TABLE 2

| Elongation | Epoxy/MGE | Acrylate | | Curative | | Appear. | Tensile | |
|---|---|---|---|---|---|---|---|---|
| Example | (parts) | Exam. | Parts | Type | parts | (a) | (psi) | (%) |
| 8 | 80/20 | 1 | 124 | PACM | 24 | c, co | 1715 | 46.3 |
| 9 | 100/0 | 1 | 378 | PACM | 26 | c, co (b) | 324 | 57.8 |
| 10 | 80/20 | 7 | 124 | PACM | 24 | — | 665 | 63.8 |
| 11 | 80/20 | 3 | 124 | PACM | 24 | c | 1715 | 25.7 |
| 12 | 80/20 | 4 | 124 | PACM | 24 | c | 1093 | 53.1 |
| 13 | 80/20 | 2 | 124 | PACM | 24 | o | 1623 | 28.1 |
| 14 | 80/20 | 3 | 124 | AEP | 24 | c, y | 1190 | 57.0 |
| 15 | 70/30 | 3 | 124 | PACM | 24 | c, co | 504 | 46.7 |
| 16 | 60/40 | 3 | 124 | PACM | 24 | c, co | 288 | 83.8 |
| 17 | 50/50 | 3 | 124 | PACM | 24 | c, co | 103 | 104.4 |
| 18 | 80/20 | 1 | 53 | DETA | (c) | c, y | 2733 | 9.3 |
| 19 | 80/20 | 1 | 53 | AEP | (c) | o, y | 2836 | 51.1 |
| 20 | 100/0 | 1 | 53 | DMEDA | (c) | c, y | 2280 | 179.4 |
| 21 | 80/20 | 6 | 124 | AEP | (c) | c, lb | 1734 | 61.0 |
| 22 | 80/20 | 5 | 53 | AEP | (c) | o, y | 2191 | 64.2 |
| 23 | 80/20 | 7 | 79 | PACM | 19 | — | 1250 | 26.7 |
| 24 | 75/25 | 1 | 79 | AEP | 21 | — | 1700 | 82.2 |
| 25 | 75/25 | 1 | 50 | Anc. (d) | 43 | — | 1264 | 71.3 |

(a) Appearance code: c — clear; co — colorless; o — opaque; y — yellow; lb — light brown.
(b) Contained a number of voids.
(c) Stoichiometric amount of curative.
(d) Mixture of Ancamine ® 1784 and 2205, products of Air Products and Chemicals, Inc.

A comparison of Examples 8 and 9 shows that omitting the monofunctional diluent, MGE, and increasing the acrylate level resulted in a product having good elongation but reduced tensile. These examples support the preference for using the combination of the acrylate copolymer flexibilizer and the monofunctional diluent.

Comparing Examples 8 and 11 shows how higher molecular weight for the acrylate copolymer provides a lower elongation value than obtained with a copolymer having a molecular weight within the preferred range. Example 11 used the copolymer of Example 3 prepared at a higher solids level and having a higher molecular weight than the copolymer of Example 1 used for the plaque of Example 8. On the other hand, Example 12 used the copolymer of Example 4 which had a lower solids level and produced a copolymer having a molecular weight lower than the preferred range. The result in the plague was a higher elongation but lower tensile strength. Example 13 used the copolymer of Example 2 which obtained a higher molecular weight product by reducing the initiator level and eliminating the chain transfer agent, dodecylmercaptan. As with Example 11, the elongation of the cured epoxy was lower than for Example 8. Additionally, the specimen of Example 13 was phase separated as evidenced by the opaque nature of the plaque. Thus, Examples 8, 11, 12 and 13 show the effect of molecular weight on the cured epoxy product. Example 14, however, shows how changing the curative from that used in Example 11 to a trifunctional curative, AEP, can increase elongation, but with a sacrifice in tensile strength. These Examples illustrate how it is possible to obtain a variety of physical property combinations in the epoxy product by adjusting the nature of the acrylate copolymer, the curative, and different levels of monofunctional diluent. Indeed, an epoxy with both high tensile and very high elongation was obtained in Example 20 using a lower level of acrylate copolymer than in Example 8 and a different curative.

COMPARATIVE EXAMPLE 26

Five epoxy plaques were prepared using PACM curative, two with and three without the monoglycidyl ether monofunctional diluent, using polyacrylates not within the scope of the invention, namely, ethylhexylacrylate homopolymer, 90/10 ethylhexylacrylate/acrylic acid copolymer, ethylacrylate homopolymer, 90/10 butylacrylate/N,N-dimethylacrylamide copolymer, and 90/10 copolymer of butylacrylate and acrylamide. Both the N,N-dimethylacrylamide and acrylamide are nonfunctional with respect to the epoxy resin and curative. In each case the epoxy compositions were too severely phase-separated to have any utility. It is concluded that such acrylate homopolymers and copolymers are not useful in the invention even though they had molecular weights within the operative range.

EXAMPLE 27

An epoxy resin formulation was prepared by thoroughly mixing 80 parts by weight of polyepoxide, diglycidyl ether of bisphenol A having an EEW of 190, 20 parts of a $C_{12}$ to $C_{14}$ monoglycidyl ether as a reactive diluent, and 53 parts of a 90/10 copolymer of butylacrylate and acrylic acid. A curative which was an adduct of 2-methyl-1,5-pentanediamine and methyl isobutyl ketone was then added, 33.2 parts, followed by additional thorough mixing and degassing at 10 mm Hg.

The amine/ketone adduct curing agent was trifunctional and made by combining 2.3 gram mol each of the diamine and MIBK in a reactor in the presence of 10 g of 5% palladium on carbon. The reactor was purged with nitrogen, pressurized to 800 psig with hydrogen, and heated to 120° C. The reactor pressure was stabilized at 770 psig and maintained at these conditions for 72 hours, after which gas uptake was complete. The reactor was vented, purged with nitrogen, the catalyst filtered out, and the product recovered by fractional vacuum distillation. The fraction boiling at 98° to 106° C. at 2 mm Hg was 98 percent monoalkylate adduct and this product was used as the trifunctional curative.

The cure of the epoxy mixture was carried out at 70° C. for 20 hours in a plaque-forming mold. Test specimens die cut from the plaque were found to have a tensile strength (at both yield and break) of 1158 psi and an elongation of 121 percent.

In addition to the advantages involving the physical properties of the cured epoxy resin, the invention provides other benefits related to ease of handling of the acrylate flexibilizer in the epoxy cure recipe, low toxicity, absence of volatile organic compounds, and no use of initiators or chain transfer agents in the cure process such as is the case with the in-situ polymerizations of the prior art.

Other advantages, features and embodiments of our invention will be apparent to those skilled in the art from the foregoing disclosure without departing from the spirit or scope of the invention.

We claim:

1. A method of curing epoxy resin to form a flexible product which comprises reacting uncured epoxy resin with an amine curing agent in the presence of a flexibilizing amount of an acrylate copolymer formed from a major amount of first monomer which is a lower aliphatic ester or amide of acrylic or methacrylic acid and a minor amount of second monomer which is an ethylenically unsaturated monomer having functionality reactive with functional groups present in said resin or said curing agent, said copolymer having a number average molecular weight in the range of 1000 to 6000.

2. The method of claim 1 wherein said copolymer is the polymerization product of a monomer system containing from 85 to 99 weight percent of said first monomer which is a lower alkyl acrylate and from 1 to 15 weight percent of said second monomer.

3. The method of claim 1 wherein said copolymer is the polymerization product of a monomer system containing from 88 to 97 weight percent of said first monomer which is an alkyl acrylate having 2 to 6 carbons in the alkyl group, and from 3 to 12 weight percent of said second monomer.

4.The method of claim 2 wherein said second monomer is acrylic acid or maleic anhydride.

5. The method of claim 4 wherein said copolymer is a copolymer of butyl acrylate and acrylic acid.

6. The method of claim 4 wherein said copolymer is a copolymer of butyl acrylate and maleic anhydride.

7. The method of claim 1 wherein said copolymer has a $T_g$ lower than 25° C.

8. The method of claim 1 wherein said reacting between said epoxy resin and said amine curing agent is also in the presence of an amine-reactive monofunctional diluent in an amount effective to reduce the crosslink density in said resin.

9. The method of claim 8 wherein said epoxy resin is a polyglycidyl ether of a phenol and said monofunctional diluent is a monofunctional epoxide or acrylate.

10. The method of claim 9 wherein said epoxy resin is a polyglycidyl ether of bisphenol A, said diluent is a $C_{12}$ to $C_{14}$ alkyl glycidyl ether, and said copolymer is a copolymer of butyl acrylate and 3 to 12 weight percent of the copolymer of acrylic acid or maleic anhydride.

11. The method of claim 1 wherein said copolymer has a ratio of weight average to number average molecular weight in the range of 1 to 3.5.

12. A cured epoxy resin which is the product of the method of claim 1.

13. A cured epoxy resin which is the product of the method of claim 3.

14. A cured epoxy resin which is the product of the method of claim 5.

15. A cured epoxy resin which is the product of the method of claim 6.

16. A cured epoxy resin which is the product of the method of claim 8.

17. A cured epoxy resin which is the product of the method of claim 10.

* * * * *